United States Patent [19]
Gold et al.

[11] Patent Number: 4,754,839
[45] Date of Patent: Jul. 5, 1988

[54] WELL BOREHOLE SALINITY MEASUREMENT USING ACOUSTIC VELOCITY

[75] Inventors: Randy Gold; David C. Rathmann, both of Houston, Tex.

[73] Assignee: Halliburton Company, Duncan, Okla.

[21] Appl. No.: 734,997

[22] Filed: May 17, 1985

[51] Int. Cl.[4] .......................... G01V 1/00; G01V 1/40
[52] U.S. Cl. .................... 181/102; 367/911; 367/27; 73/151
[58] Field of Search ........... 166/64, 66; 175/48, 175/50; 181/102, 103, 104, 105; 250/258; 340/860, 856, 861; 367/25, 27, 26, 33, 35, 83, 13, 911, 912, 155; 376/166; 73/597, 151–155; 310/341

[56] References Cited

U.S. PATENT DOCUMENTS

| | | | |
|---|---|---|---|
| 2,425,869 | 8/1947 | Dillon | 367/83 X |
| 2,573,390 | 10/1951 | Blanchard | 367/83 X |
| 3,407,398 | 10/1968 | Stearn | 367/13 X |
| 3,648,513 | 3/1972 | Patterson | 73/597 |
| 3,770,378 | 11/1973 | Russell | 73/153 X |
| 3,974,476 | 8/1976 | Cowles | 367/25 X |
| 3,975,674 | 8/1976 | McEuen | 367/41 X |
| 4,087,781 | 5/1978 | Grossi et al. | 340/854 |
| 4,236,406 | 12/1980 | Reed et al. | 73/597 |
| 4,287,415 | 9/1981 | Arnold | 376/166 X |
| 4,508,169 | 4/1985 | Mut et al. | 73/155 |

FOREIGN PATENT DOCUMENTS 0160679  12/1981  Japan ........................ 73/155

Primary Examiner—Deborah L. Kyle
Assistant Examiner—Brian S. Steinberger
Attorney, Agent, or Firm—William J. Beard

[57] ABSTRACT

In the preferred and illustrated embodiment salinity measuring apparatus is disclosed. An elongate sonde has a housing with an internal chamber. The chamber is perforated by opening to the exterior to introduce well fluid. Transverse plates define the chamber and mount the acoustic transducer which sends an acoustic pulse along the chamber. An acoustic transceiver is coupled to a timer circuit which determines changes in transit time as a function of salinity compared to pure water.

3 Claims, 2 Drawing Sheets

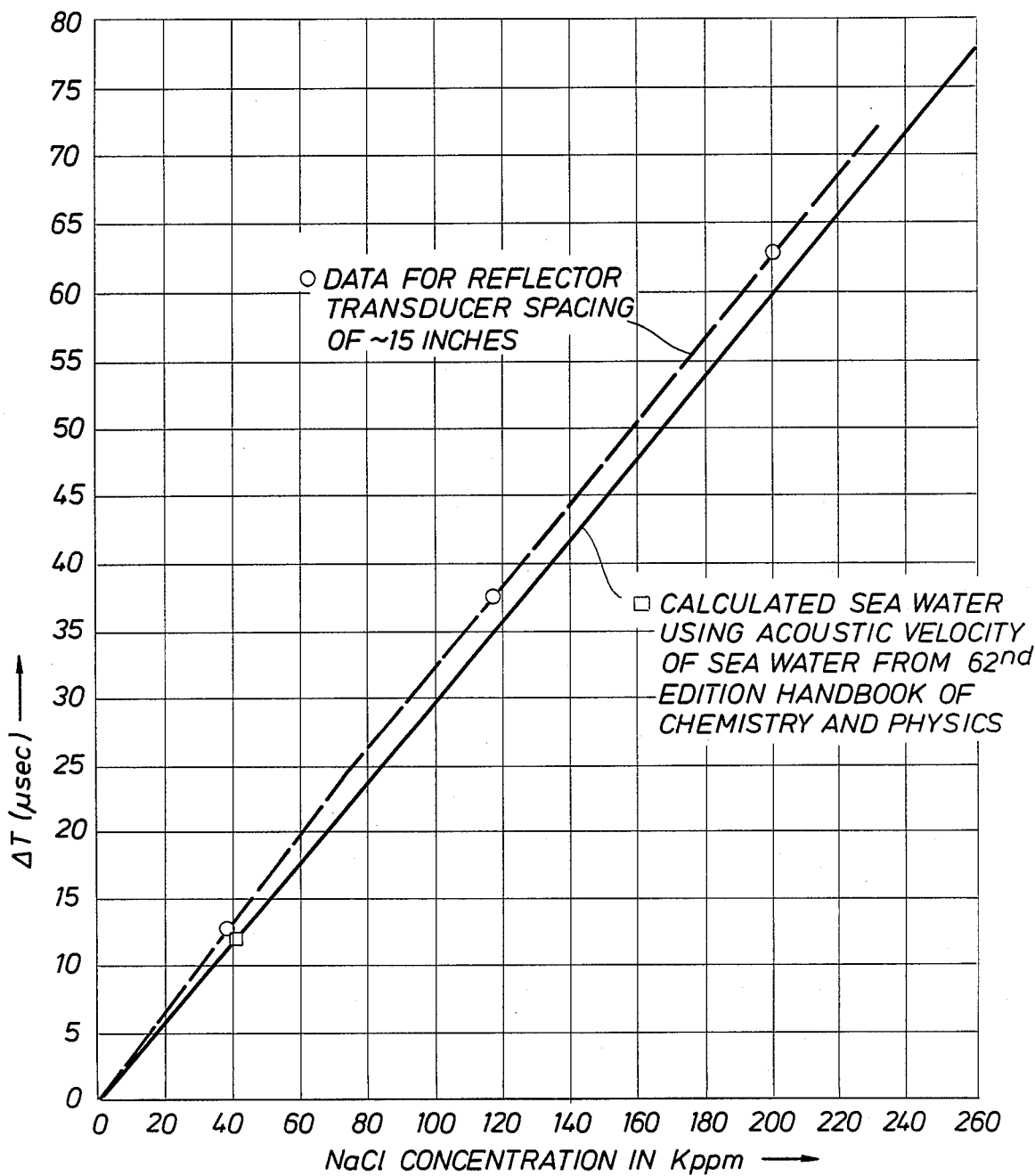

WELL BOREHOLE SALINITY MEASUREMENT USING ACOUSTIC VELOCITY

BACKGROUND OF THE DISCLOSURE

The apparatus of the present invention is directed to measuring the salinity of a solution. In particular the salinity of solutions in a well borehole is measured in situ. As an example, either at the drilling stage or in later operation of a producing well, formations along the well borehole may produce substantial quantities of water. The measure of salinity of the water in the borehole is important. For instance, some of the formations being drilled may be fresh water, and other formations may produce salt water. It is particularly important when salt water is encountered to provide a means for isolation of salt water so that it does not travel up or down the borehole and invade nearby fresh water or petroleum bearing formations. The drilling fluid which is ordinarily used in the drilling process includes substantial portions of water.

In another circumstance, a producing well may produce oil above a salt water formation for a period of years. Typically, the drive or pressure in the producing formation forces the fluids upward. If the oil is depleted by draining the formation at a certain depth, the oil may stop flowing into the well and the driving water below may invade the well. In the instance where this invading fluid is salt water, significant changes in the operation of the well must be undertaken. For instance, the well may require plugging of the original perforations and reperforation at a higher elevation. Moreover, the impact of salt water (compared with fresh water) on the equipment located in the well is important. Salt water is more corrosive than fresh water. Damage to the equipment in part depends on the salinity of the water produced in the well. Some wells may produce a mix of oil and water and again, the salinity of the water produced by the well becomes important.

Perhaps the most important use of salinity measuring apparatus is in conjunction with other logging equipment which performs a TMD measurement capture cross section. The data obtained from such a measurement system is significantly aided if salinity of water is also furnished. Thus, the salinity measurement of this apparatus (obtained in the well) assists in delineating oil and water to infer a measurement of moveable oil. The salinity measuring device is very desirable as an adjunct to other measuring instruments.

For these reasons and numerous other reasons, such as an aid in the interpretation of well logs it is important to periodically measure the salinity of water or drilling fluid in a well.

This apparatus sets forth an in situ salinity measuring system. The system is particularly desirable for use in measuring salinity over a very wide range. Borehole waters may range in salinity from fresh water to greater than 26% by weight salt content thus, requiring a large dynamic range. Other salinity measurement techniques include measurement of electrical properties such as resistivity or conductivity, specific gravity and chemical analysis of the water. Substantially pure water is fairly resistive; saturated salt water is reasonably conductive. However, electrical measurements have a limited range and accurate measurement requires sample dilution or a change in calibration cell for salinities greater than about 10% salt. A specific gravity measurement using hydrometers gives rise to some problems in use and handling. The range of one hydrometer is limited, and hence the full range of salinity cannot be accurately determined by one hydrometer. In fact, several would be required to determine the full range of salinity. Moreover, chemical analysis, hydrometer and the electrical measurements do not lend themselves to in situ use in a borehole. Therefore, these methods require some type of device to be placed into the borehole to bring the sample to the surface for delayed measurement.

With these limitations on other approaches in view, the present apparatus is directed primarily to a salt water concentration measurement procedure particularly adapted to be performed in a down hole environment. This yields an apparatus which can be mounted in a pressure resistant body member or sonde, lowered on an armored logging cable into a well to any selected depth. The present apparatus utilizes an elongate measuring chamber within the sonde. Suitable perforations in the wall of the sonde defining the chamber are incorporated to enable well fluid to flow into and out of the chamber. The measuring chamber has upper and lower ends. A reflector is placed at one end and an acoustic transducer is placed at the opposite end. An acoustic wave is transmitted through the liquid and bounced off the reflector surface opposite it. The return signal is observed utilizing an acoustic transducer. The elapsed time of travel is noted by a time measuring circuit. Changes in transit time are proportional to changes in salinity. Thus, with a fixed spacing between the transducer and the reflector surface a norm is established for water having no salt. The changes in transit time yield a measure of salinity.

This apparatus is particularly useful in determining the measure of salinity over the wide dynamic range up to full saturation.

BRIEF DESCRIPTION OF THE DRAWING

So that the manner in which the above-recited features, advantages and objects of the present invention, as well as others which will become apparent, are attained and can be understood in detail, a more particular description of the invention, briefly summarized above, may be had by reference to the embodiments thereof illustrated in the appended drawings, which drawings form a part of this specification.

It is to be noted, however, that the appended drawings illustrate only typical embodiments of this invention and are not to be considered limiting of its scope, for the invention may admit to other equally effective embodiments.

FIG. 2 is a graph of time versus salinity.

DETAILED DESCRIPTION OF THE PREFERRED EMBODIMENT

Figure 1:
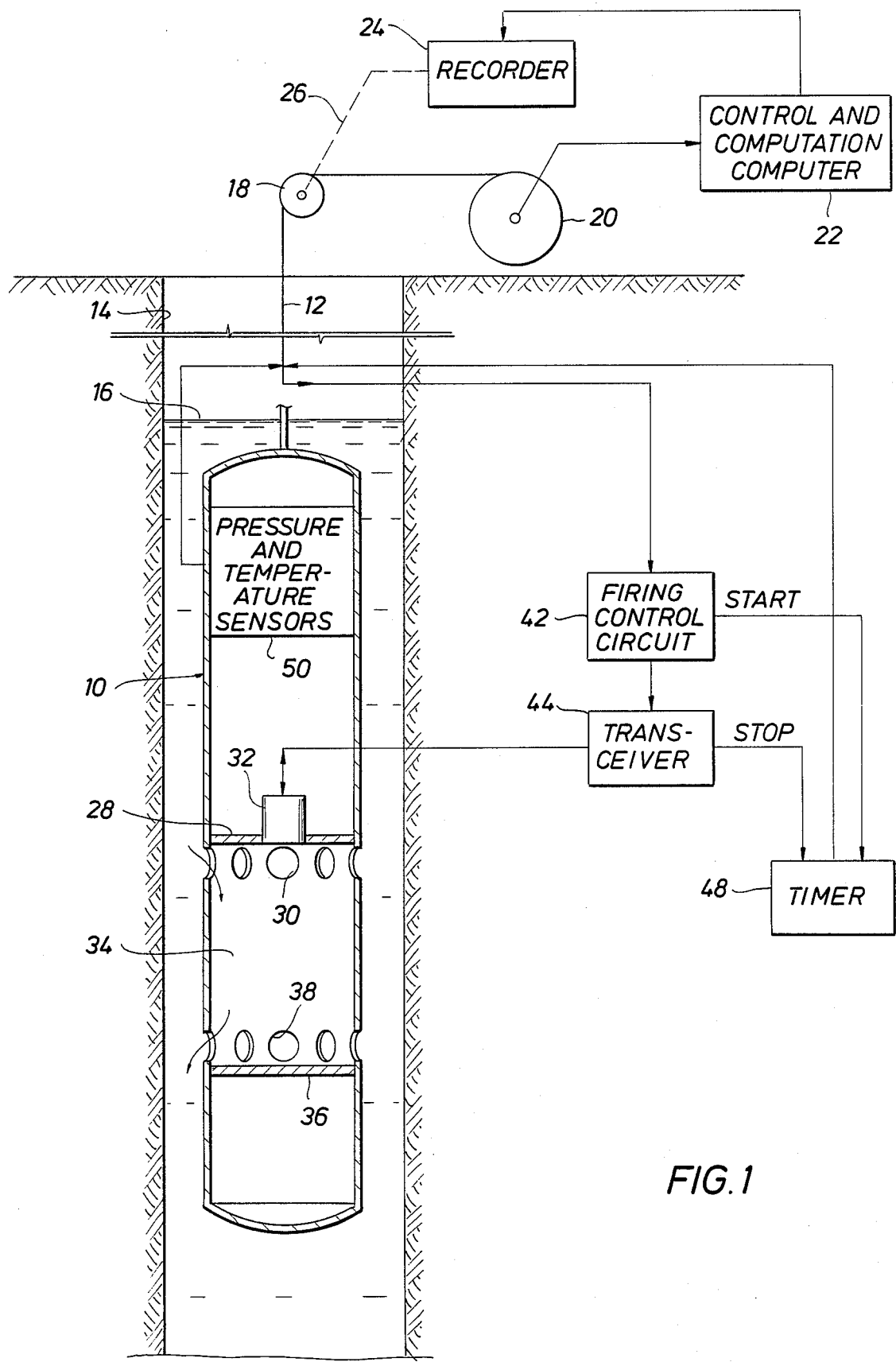
FIG. 1 shows a salinity measuring system incorporated in a sonde adapted to be lowered into a well borehole and further illustrates construction of the appartus in the sonde and the circuit components for providing an output indicating the measured salinity.

Attention is directed to FIG. 1 incorporated with this disclosure wherein the numeral 10 identifies a pressure resistant body member or sonde adapted to be lowered on an armored well logging cable 12 into a well borehole 14. This apparatus may be used when the borehole is open hole, cased or cased partially. The present system may also be adapted to be used in a completed well where there may be a production tubing string also placed in the well. Without regard to the circumstances, the sonde 10 is lowered until it is submerged in a borehole fluid which is assumed to be water (which may or may not be) and which may or may not include salt in solution. The water level in the borehole is indicated at 16. The logging cable 12 is several thousand feet long to accomodate testing of wells of great depth. The logging cable 12 extends to the surface where it passes over a sheave 18 and is spooled on a drum 20. Multiple electrical conductors are contained in the armored logging cable 12. They are connected at the surface to a control and computation computer 22. The control and computation circuit 22 which may comprise, for example, a small general purpose digital computer such as a model PDP-11 provided by the Digital Equipment Corp. of Cambridge, Mass., and provides suitable timed signals for operation of the equipment located downhole. Moreover, the control and computation computer 22 provides pressure and temperature compensation to the transit time signals obtained from the sonde 10. The control and computation circuit 22 is thus connected to a recorder 24. The output salinity, temperature and pressure data is recorded. This data must be related to depth, and to this end, mechanical or electronic depth measuring apparatus 26 is connected from the sheave wheel 18 to the recorder 24 to input depth measurements. The sheave rotates as the cable 12 is lowered into the well bore and thus provides depth information regarding the depth of the sonde 10 in the borehole.

Once the sonde 10 is located below the surface 16 of fluid in the well, the fluid can be tested for salinity. The sonde incorporates a closed housing which is typically a ruggedized cylindrical housing. In this housing, the numeral 28 identifies a transverse closure plate or bulkhead across the sonde. Immediately adjacent to the closure plate 28, there are a number of ports or holes 30 formed in the housing. These ports or holes communicate the fluid in the well from the exterior to the interior of the tool. There are one or more ports at 30. Typically, the number can be increased so that fluid flow is easily obtained to the interior below the plate 28. The plate or bulkhead 28 supports an acoustic transducer 32. The transducer 32 is a well known device such as a piezoelectric ceramic or the like which produces an acoustic wave which is transmitted from the acoustic transducer 32 and which travels longitudinally along the sonde through a transmission chamber 34. The upper end of the chamber 34 is defined by the transverse plate or bulkhead 28. The lower end is defined by a transverse bulkhead or plate 36. The plate 36 supports a facing reflective surface. An acoustic wave transmitted from the transducer 32 travels the length of the chamber 34 and is reflected back to the transducer 32. Preferably, the transducer 32 is used both as a transmitter and receiver device. That is, it is enabled to transmit an acoustic pulse and to also receive the reflected return acoustic pulse even though it is substantially smaller in amplitude. At the lower end, the acoustic reflective plate 36 is illustrated immediately adjacent to a number of ports 38. The ports 38 also admit flow of well fluid into and out of the chamber 34. In general terms, the measurement obtained by the present appartus remains true and accurate without regard to location of the acoustic transducer at the top or bottom of the chamber 34.

The acoustic transducer 32 is connected to electronic circuitry shown adjacent to the sonde in the drawing and which circuitry is located within the sonde 10. There is a firing control circuit 42. Upon receipt of an appropriate timing signal from the control computer 22, the firing control circuit 42 forms an output timing pulse which is delivered to a transceiver 44 and timer 48 (starting timer). The transceiver 44 forms a voltage pulse of specified voltage output from the transceiver 44 to the acoustic transducer 32. Transducer 32 generates an acoustic signal which is transmitted through the chamber 34 and is reflected at polate 36. The received acoustic reflection from the opposite end of the chamber 34 is detected at the transducer 32 which generates an electrical waveform representative of the acoustic reflection. This electrical signal is passed to transceiver circuit 44. Transceiver 44 amplifies the received signal and provides an output pulse which is supplied to timer circuit 48 (the stopping timer). The timer circuit 48 measures elapsed time between the transmitted signal and the received signal.

The velocity of the acoustic wave in the fluid in chamber 34 may be related to the salinity of the fluid through the relationship $v = b/\rho$ where v is the velocity of a longitudinal wave in the fluid, b is the bulk modulus of the fluid and $\rho$ is the density of the fluid. The bulk modulus b changes nearly linearly with fluid salinity (see Hong, et al: "Salt Content Changes Compresibility of Resevoir Brines" *The Petroleum Engineer,* July 1961 page B-25). This dominates the density term in the above equation and results in a near linear relation between acoustic velocity and salinity. This relationship can be programmed into the computer 22 at the surface to provide a log or recording of fluid salinity as a function of borehole depth. Thus, a specific transit time interval can be determined for transmission through pure water, that is, water having no salt in it. Deviation from this interval can then be interpreted as a measure of salinity, see FIG. 2. The timer 48 measures the transit time along the chamber 34. Change in transit time from the base time (referring to water having no salt) yields a measure proportional to salinity. This permits ready calibration in the computer 22 of change in transit time proportionate to the salinity.

FIG. 2 shows a calculated curve and measured curve. The data is quite linear, enabling easy conversion of time in microseconds to salinity in kppm.

The relationship whereby change in transmission time is proportional to salinity is dependent on knowledge of pressure and temperature. To this end, pressure and temperature sensors are incorporated in the sonde 10 at its upper end 50. Pressure and temperature measurements are provided and sent to the surface for modification of the value determined by the timer 48. That is, the incremental change in transit time is best modified as a function of pressure and temperature in the computer 22 so that the data recorded at the recorder 24 is calibrated for the actual pressure and temperature.

In operation, the apparatus is used in the following manner. The sonde 10 is lowered in the well to a depth where it is submerged below the liquid level 16. Utilizing the control and computation computer 22 at the surface, a signal is provided to the firing control circuit 42. It is operated as many times as necessary to provide accurate data. The firing control circuit 42 provides a trigger signal to the transceiver 44 which forms a voltage pulse. The firing circuit 42 also simultaneously signals the timer to start the timer cycle. The voltage pulse is applied to the acoustic transducer which generates an acoustic wave front into the chamber 34. The wave travels the length of the chamber 34 to the reflector plate 36 and is returned to the transducer 32. The transducer also operates as a receiving transducer and forms an input signal for transceiver 44. That signal is amplified by transceiver 44 and output to the timer 48 (stopping timer cycle). The timer 48 measures the transit time. Variations of transit time are proportional to salinity (see FIG. 2). As appropriate, pressure and temperature are measured by the sensors at 50. The signals representing transit time, temperature and pressure are sent to the surface computer 22 and these values are utilized to adjust the salinity determined by the timer 48. While the foregoing is directed to the preferred embodiment, the scope of the present disclosure is determined by the claims which follow.

What is claimed is:

1. An apparatus for measuring the salinity of salt water in a well borehole, comprising:
    (a) an elongate sonde adapted to be lowered on a logging cable into a well borehole;
    (b) an internal chamber in said sonde defined by a surrounding upstanding outer housing about said chamber and wherein an opening in said housing forms a fluid flow opening for admitting well fluid to said chamber from the well borehole wherein the fluid may include salt water;
    (c) spaced transverse walls across said sonde defining upper and lower ends of said chamber wherein said walls form fluid tight partitions;
    (d) acoustic transmitter means supported by one of said walls adjacent to said chamber for transmitting a pulse of acoustic energy wholly within said chamber;
    (e) acoustic receiver means for receiving a transmitted pulse from said transmitter means;
    (f) said transmitter and receiver means cooperating with said chamber to enable fluid measurement within said chamber means; and
    (g) means for measuring the elapsed time of transit of an acoustic pulse through the fluid in said chamber, said means forming an output signal indicative of acoustic travel time in said chamber to obtain an indication of well borehole salinity.

2. The apparatus of claim 1, wherein:
said walls are parallel and are spaced along said sonde to enable upper and lower fluid flow openings to admit fluid in said chamber and wherein said chamber supports a transducer on one of said walls and said transducer is adapted to serve as both of said transmitter and receiver means.

3. The apparatus of claim 2, wherein:
said transducer is mounted to transmit axially of said chamber from one of said walls, and the other of said walls is reflective to the acoustic pulse to reflect the pulse to said transducer serving as said receiver means.

* * * * *